United States Patent [19]

Mondshine

[11] 4,369,843
[45] * Jan. 25, 1983

[54] WELL COMPLETION AND WORK OVER METHOD

[75] Inventor: Thomas C. Mondshine, Houston, Tex.

[73] Assignee: Texas Brine Corporation, Houston, Tex.

[ * ] Notice: The portion of the term of this patent subsequent to Feb. 5, 1997, has been disclaimed.

[21] Appl. No.: 874,770

[22] Filed: Feb. 3, 1978

Related U.S. Application Data

[63] Continuation-in-part of Ser. No. 735,168, Oct. 26, 1976, abandoned.

[51] Int. Cl.³ .............................................. E21B 33/138
[52] U.S. Cl. .............................. 166/292; 166/305 R; 252/8.55 R
[58] Field of Search ............ 252/8.55 R, 8.5 A, 8.5 B, 252/8.5 LC; 166/305 R, 283, 308, 292

[56] References Cited

U.S. PATENT DOCUMENTS

| | | | |
|---|---|---|---|
| 3,246,692 | 4/1966 | Metler et al. | 252/8.55 R |
| 3,319,715 | 5/1967 | Parks | 252/8.55 |
| 3,675,717 | 7/1972 | Goins et al. | 166/278 |
| 3,852,201 | 12/1974 | Jackson | 252/8.5 |
| 3,986,964 | 10/1976 | Smithey | 252/8.5 |
| 3,988,246 | 10/1970 | Hartfiel | 252/8.5 |
| 4,003,838 | 1/1977 | Jackson et al. | 252/8.5 |
| 4,046,197 | 9/1977 | Gruesbeck et al. | 252/8.5 |
| 4,186,803 | 2/1980 | Mondshine | 166/292 |

OTHER PUBLICATIONS

Rogers, Composition and Properties of Oil Well Drilling Fluids, Third Edition, Pub. 1963, pp. 426–478 and 619–622.

*Primary Examiner*—Herbert B. Guynn
*Attorney, Agent, or Firm*—Jack W. Hayden

[57] ABSTRACT

A well completion and workover method wherein a subterranean formation is contacted with a high density, nondamaging treating fluid which comprises a saturated, aqueous saline solution with at least one water soluble salt that is substantially insoluble in the saturated saline solution. The water soluble salt has a particle size range of about 5 microns to about 800 microns, and greater than about 5 percent of the particles are coarser than 44 microns to control the pressure in the formation; to bridge and seal off the formation; to avoid particle invasion; and also to minimize fluid loss to the formation. A minor amount of a fluid loss additive is included in the treating fluid to inhibit loss of fluid into the formation and a minor amount of a suspension additive is included in the treating fluid to prevent settling of the water soluble salt particles in the aqueous saline solution. The aqueous saline solution should have a density of at least about 10 pounds per gallon.

5 Claims, 2 Drawing Figures

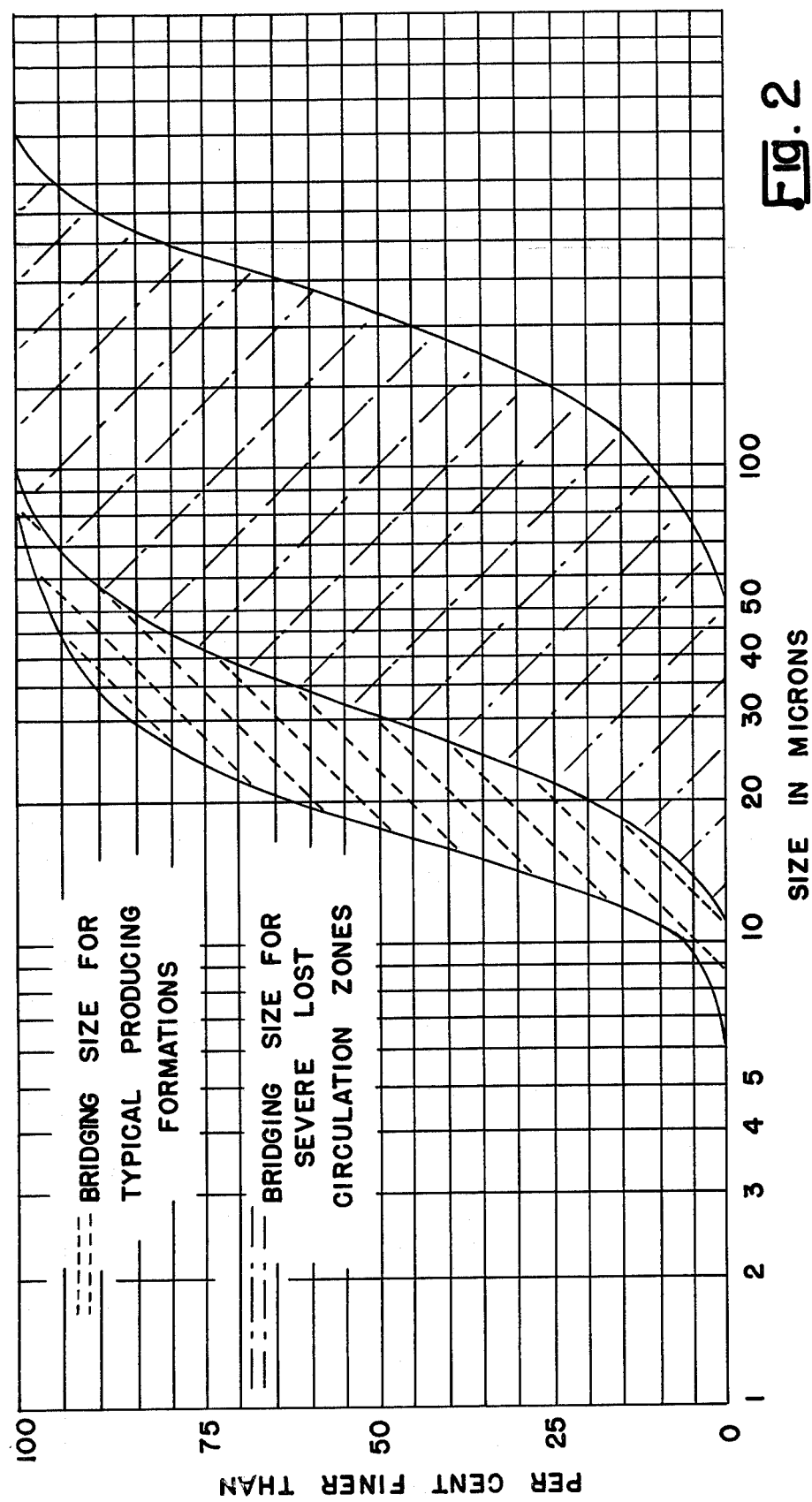

WELL COMPLETION AND WORK OVER METHOD

CROSS REFERENCE TO RELATED APPLICATIONS

This application is a continuation-in-part of my prior copending application Ser. No. 735,168 filed on Oct. 26, 1976, now abandoned, for "Well Completion and Workover Fluid," and also relates to my copending application Ser. No. 850,639 filed on Nov. 11, 1977, now U.S. Pat. No. 4,175,042, for "Well Completion and Workover Fluid and Method of Use."

BACKGROUND OF THE INVENTION

1. Field of the Invention

The invention relates to a method of completing a well after it has been drilled, or of servicing a well by workover operations. More particularly, it relates to a method of completing and workover of a well by contacting subterranean formation which produce hydrocarbons with aqueous well completion and workover fluids to maintain the hydrocarbons in the producing well formation or formations under control while at the same time inhibiting or preventing damage to the producing formation or formations during the completion or workover operations.

2. Description of the Prior Art

After a well has been drilled into the earth's surface, one or more subterranean producing formations may be encountered. It is then desirable to complete the well so as to obtain the maximum hydrocarbon production from such subterranean producing formations, and to complete such well in a manner so that the pressure in the subterranean producing formations is controlled during completion operations, while bridging or sealing off the producing formation to inhibit damage thereto and to minimize fluid loss into the formation which might inhibit or in some cases substantially reduce the production of hydrocarbons from the subterranean producing formation.

Also, it is desirable or necessary after a period of time to perform workover or other service operations on a previously drilled well, and during such workover or service operations, it is desirable to control the pressure in the subterranean producing formation or formations while at the same time bridging or sealing off the formations in a manner so as to minimize particle invasion and fluid loss into the producing formation or formations and thereby reduce if not substantially eliminate damage to the formations.

In addition to the necessary required density characteristics of a workover and completion fluid, it is desirable to seal off or temporarily plug the face of the subterranean producing formation or formations in the well bore so that during the completion and workover operation fluid and solids in the fluid are not lost to the producing formation which might cause damage thereto.

Heretofore various types of workover and completion fluids with components therein of a particle size to bridge and seal off the producing formations have been employed that are either oil soluble or acid soluble, depending upon whether or not the bridging and sealing agents in the completion workover fluid is soluble in oil or in acid. The use of such fluids is undesirable because oil or acid may have to be employed to remove the particles for maximum hydrocarbon production.

SUMMARY OF THE INVENTION

The present invention broadly comprises an improved well completion workover method wherein a subterranean hydrocarbon-producing formation or formations is contacted with a high density, nondamaging treating fluid for controlling the formation pressure and also for temporarily bridging and sealing off the productive formation or formations in the well bore to minimize fluid loss or damage to such producing formations. The treating fluid comprises a saturated aqueous saline solution with at least one water soluble salt which is substantially insoluble in the saturated saline solution, the water soluble salt having a particle size range of about 5 microns to about 800 microns with greater than 5 percent of the particles being coarser than 44 microns to control the pressure in the formation while bridging and sealing it and also minimizing particle invasion to the formation. A minor amount of fluid loss additive to inhibit loss of fluid into the subterranean producing formation, and a suspension additive to prevent settling of the water soluble salt particles is included in the treating fluid. The water soluble salt which is substantially insoluble in the saline solution is added in sufficient quantity to control the pressure in the producing formation by increasing the density of the treating fluid.

The bridging and sealing salt particles used in the well completion and workover method can be dissolved by the flow of produced field brine or by the injection of water or an unsaturated saline solution. This eliminates the undesirable use of oil or acid solutions to remove the bridge from the subterranean hydrocarbon producing formation.

DESCRIPTION OF THE PRIOR ART

The prior art with which applicant is familiar is U.S. Pat. No. 4,046,197; the patents cited therein and cited in the parent of this application; and a brochure by Gulf Research and Development Center Production Services Division, Houston Technical Services Center entitled "Graded Rock Salt: A temporary Diverting Agent For Fracturing".

BRIEF DESCRIPTION OF THE DRAWINGS

FIG. 2 is a chart illustrating the range of sized salt particles to provide water soluble bridging agent suspended in the saturated brine solution including the range for use in a typical producing formation and for severe lost circulation zones.

DESCRIPTION OF THE PREFERRED EMBODIMENT

Figure 1:
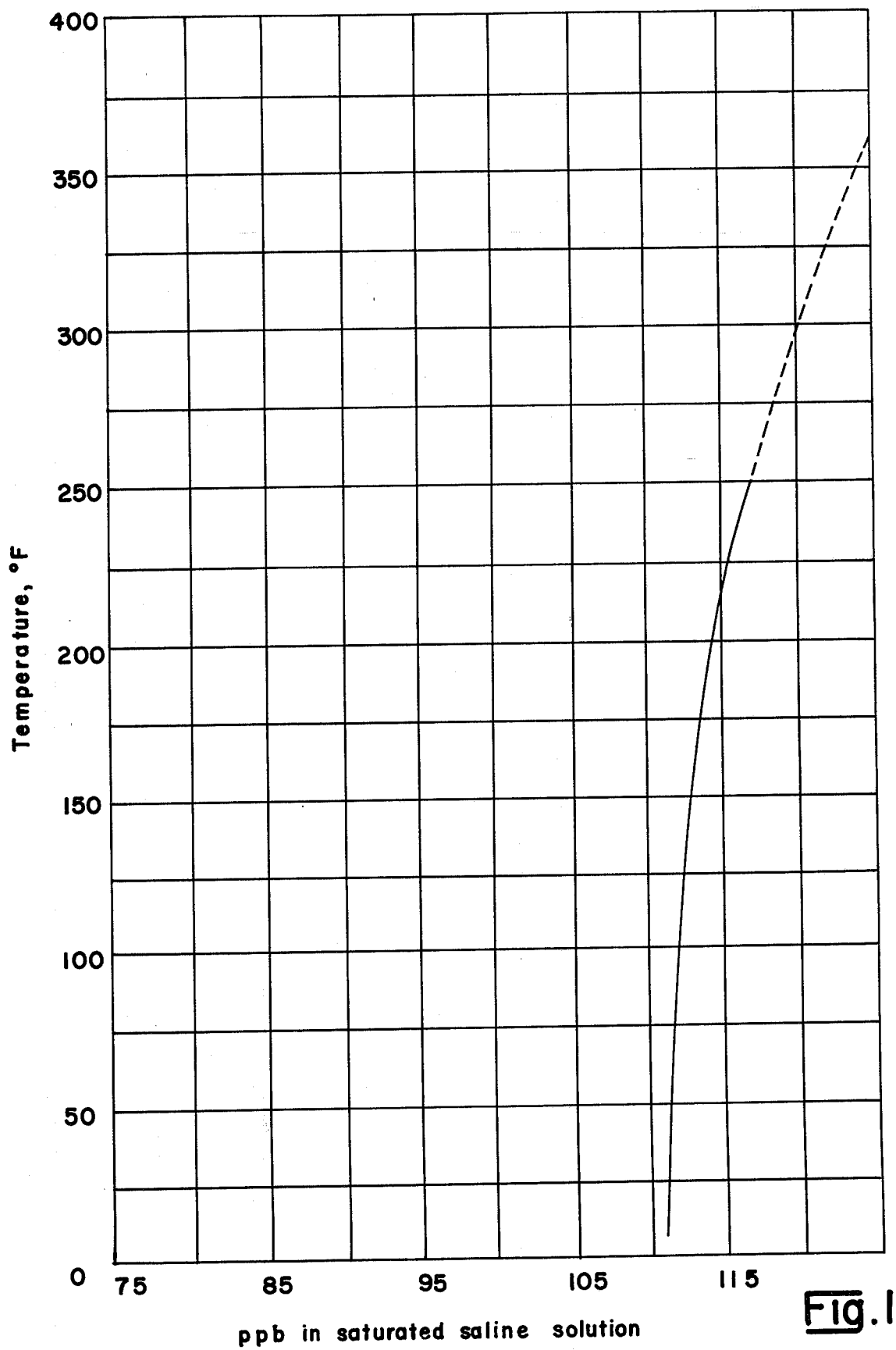
FIG. 1 is a graph illustrating salt solubility in pounds per barrel (ppb) of water at various temperatures.

The saturated saline solution of the present invention is formed by dissolving a salt or mixture of salts in water and normally the minimum density of the saturated saline solution is approximtely at least 10 pounds per gallon. In those situations where it is desirable to employ the present invention with a density less than 10 pounds per gallon the saturated saline solution can be diluted with some suitable substance such as diesel oil. In addition, the density of the saturated saline solution can be increased by the addition of iron carbonate or barites to provide a completion and workover fluid with bridging agents having a density of approximately 19 pounds per gallon when desired. Additional quantity of sized salt particles may be added to increase the density as may be desired.

The saturated saline solution can be formed by dissolving any suitable salt or mixture of salts in water to form the saturated saline solution. Some salts that are generally available and which may be used include potassium chloride, sodium chloride, calcium chloride, sodium sulfate, sodium carbonate, sodium bicarbonate, calcium bromide and potassium carbonate. When the invention is employed in well bores which have increased temperatures, the sized salt which is employed as the bridging agent in the completion fluid is added in a sufficient quantity so that even though some of it may dissolve at higher temperatures, the amount dissolved will not materially affect the action of the sized salt particles suspended in the saturated saline solution in functioning as a water soluble bridging agent for temporarily plugging the producing formation pores during the completion and workover procedure.

Any water soluble salt which is substantially insoluble in the saturated saline solution may be employed. Some which are generally available include potassium chloride, sodium chloride, calcium chloride, sodium sulfate, sodium carbonate, sodium bicarbonate, calcium bromide and potassium carbonate. In some instances, it may be desired to use a mixture of these salts. The preferred particle size range of the water soluble salt to be suspended in the saturated saline solution is in a range from about 5 microns to about 800 microns and wherein greater than 5% of the particles are coarser than 44 microns. The quantity of the water soluble salt to be added to the saturated saline solution may vary but is in a sufficient amount to accommodate the temperature conditions in which the present invention is to be employed.

Generally, the amount of sized salt, or mixture thereof, added to the saturated saline solution will vary from approximately 10 pounds per barrel of saturated saline solution to about 900 pounds per barrel of saturated saline solution depending upon the density desired in the workover and completion fluid. Those skilled in the art will know the density desired to balance or offset the formation pressure in the well bore, and it is well known to those skilled in the art how to calculate the amount of salt and add the salt, or mixture of salts to the saturated saline solution to obtain such desired density.

FIG. 1 is a chart illustrating the solubility of sodium chloride salt at various temperatures in pounds per barrel of saturated saline solution at varying temperatures and it will be noted that if the saturated saline solution is prepared at an ambient temperature of, by way of example 75° F., there are about 111 pounds per barrel of salt per barrel of saturated saline solution and if the temperature is increased upwardly towards 300° F., the salt solubility approximates 120 pounds per barrel.

Thus, even though some of the sized particles may be dissolved should the well bore conditions approach substantially increased temperatures as reflected on the salt solubility chart of FIG. 1, the remaining particles suspended in the saturated saline solution will function as water soluble bridging agents for the producing formation.

The saturated saline solution with the sized salt particles therein as described above may be employed with any suitable well known viscosifier to provide the desired viscosity and suspension characteristics to the well completion and workover fluid to retain the sized salt particles in suspension in the saturated saline solution. In most situations it is desirable to provide additional additives to enhance the fluid loss control or filtration control of the completion fluid.

One of the primary advantages of the present method is that after workover or completion procedures have been completed in the well bore, the sized salt particles forming the bridge on the producing formation may be removed by connate water in the permeable formation which has been temporarily coated. Also, a nonsaturated saline solution or water can be flushed in the well bore to remove the water soluble bridging agents, thus eliminating any problems that are encountered when an oil soluble or an acid soluble bridging agent is employed.

In FIG. 2 the chart illustrates the particle size range of the water soluble salts employed in the saturated saline solution to provide the water soluble bridging particles for use as a bridging agent in a producing formation during workover and completion operations, and it will be noted that the preferred particle size range of such salts is between 5 and 800 microns and wherein greater than 5% of the particles are coarser than 44 microns.

The foregoing particle size range is satisfactory for use in formations of varying permeabilities as well as in vugular formations and fractured formations.

One suitable additive for obtaining desired viscosity and suspension is hydroxyethyl cellulose. Hydroxyethyl cellulose is prepared by treating cellulose with caustic and then reacting the caustic treated cellulose with about 1 to 3 moles of ethylene oxide for each anhydroglucose unit in the cellulose molecule. The viscosity of an aqueous solution of hydroxyethyl cellulose depends upon the concentration and molecular weight of the hydroxyethyl cellulose. Broadly, the hydroxyethyl cellulose employed in the practice of this invention has about 1 to 3 moles of substituent ethylene oxide per anhydroglucose unit and is characterized by a Brookfield viscosity of about 1,500 to 5,000 centipoises at 25° C. for a 1 weight percent solution thereof. A preferred hydroxyethyl cellulose has about 2.5 moles of substituent ethylene oxide per anhydroglucose unit and is characterized by a viscosity of about 1,500 to 2,500 centipoises at 25° C. for a 1 weight percent solution. A suitable hydroxyethyl cellulose is marketed by Union Carbide under the trademark Cellosize QP-100 MH. Hydroxyethyl cellulose is employed to increase the viscosity of the fluid and to increase the stability of the dispersion.

In general, most of the water soluble cellulose ethers can be used as a viscosifier and to provide suspension for the sized salt particles of the invention. Said cellulose ethers which can be used include, among others: the various carboxyalkyl cellulose ethers, e.g., carboxyethyl cellulose and carboxymethyl cellulose (CMC); mixed ethers such as carboxyalkyl hydroxyalkyl ethers, e.g., carboxymethyl hydroxyethyl cellulose (CMHEC); hydroxyalkyl celluloses such as hydroxyethyl cellulose, and hydroxypropyl cellulose; alkylhydroxyalkyl celluloses such as methylhydroxypropyl cellulose; alkyl celluloses such as methyl cellulose, ethyl cellulose, and propyl cellulose; alkylcarboxyalkyl celluloses such as ethylcarboxymethyl cellulose; alkylalkyl celluloses such as methylethyl cellulose; and hydroxyalkylalkyl celluloses such as hydroxyethylmethyl cellulose, hydroxypropylmethyl cellulose; and the like. Many of said cellulose ethers are available commercially in various grades. The carboxy-substituted cellulose ethers are available as the alkali metal salt, usually the sodium salt. However, the metal is seldom referred to and they are commonly referred to as CMC, CMHEC, etc. For example, water soluble CMC is available in various degrees of carboxylate substitution ranging from about 0.3 up to the maximum degree of substitution of 3.0. In general, CMC having a degree of substitution in the range of 0.65 to 0.95 is preferred. CMC having a degree of substitution in the range of 0.85 to 0.95 is a more preferred cellulose ether. CMC having a degree of substitution less than the above preferred ranges usually provides too low a viscosity and is thus less desirable. Said degree of substitution of CMC is commonly designated in practice as CMC-7, CMC-9, CMC-12, etc., where the 7, 9, and 12 refer to a degree of substitution of 0.7, 0.9, and 1.2, respectively. CMC having a degree of substitution of 0.7 through 0.9 serves quite well and can be used with the saturated saline and salt particles. For example, in CMHEC it is preferred that the carboxymethyl degree of substitution be at least 0.4. The degree of hydroxyethyl substitution is less important and can range widely, e.g. from about 0.1 or lower to about 4 or higher.

Xanthan gum, which is used as a suspending agent, is also available commercially. It is a hydrophilic colloid produced by bacterium of the species Xanthnomonas campestris. The colloid is a polymer containing mannose, glucose, glucuronic acid salts such as potassium glucuronate, sodium glucuronate, or the like, and acetyl radicals. Other Xanthomonas bacteria have been found which produce the hydrophilic gum and any of the xanthan gums and their derivatives can be used in this invention.

Xanthan gum is a high molecular weight linear polysaccharide that is readily soluble in water to form a viscous fluid. Examplary of the xanthan gums that can be employed is an industrial grade of xanthan gum marketed by the Kelco Company under the trademark Kelzan XC xanthan gum. Xanthan gum increases the gel strength of the fluid without appreciably increasing its viscosity.

Guar gums and their derivaties can also be used. Guar gum is a nonionic naturally occurring, high molecular weight polysaccharide. For example, hydroxypropyl guar gum and carboxymethyl hydroxypropyl guar, and quaternary ammonium guar gum may be used.

Other suitable viscosifiers and suspension agents can be employed other than those specifically mentioned above, and I have found that any one of such viscosifiers and suspension agents, or any combination of mixture of suitable viscosifier and suspension agents may be employed, including those mentioned above in any amount as may be desired and preferably in the range of about 0.2 pounds per barrel to about 5 pounds per barrel of saturated saline solution.

Fluid loss control additives which are well known in the art may be employed including by way of example only, calcium lignosulfonate, chrome or ferro chrome lignosulfonate, starches such as corn, potato and tapioca and their derivatives and carboxymethyl cellulose having a degree of substitution in the range of 0.4 through 0.9. The fluid loss control constituents may be added in any amount desired and preferably in the range of about 0.2 pound per barrel to about 10 pounds per barrel of saturated saline solution alone or in any combination.

Where any of the lignosulfonates are used either alone or with any of the other fluid loss control agents the amount may be in the range of about 0.2 pound per barrel to about 20 pounds per barrel of saturated saline solution. Also, it is well known in the art that when any of the lignosulfonates are employed it is desirable to neutralize the acidic nature of the lignosulfonates. This may be done by adding a material to raise the pH of the completion fluid to at least 7. Any one or more of the alkaline earths, such as magnesium oxide or calcium oxide may be employed. Sodium hydroxide may also be used. The amount of material used to adjust the pH of the completion fluid is in the range of about 0.15 pounds to about 5 pounds per barrel of saturated saline.

COMPOSITION AND PROPERTIES OF VARIOUS WORK OVER AND COMPLETION FLUIDS USING SPECIALLY SIZED SALT BRIDGING MATERIAL

| EXAMPLE | 1 | 2 | 3 | 4 | 5 | 6 |
|---|---|---|---|---|---|---|
| Composition in pounds per bbl saturated saline solution | | | | | | |
| Hydroxyethyl Cellulose (Cellosize QP 100 MH) | 2 | 2 | | | | |
| Salt (ranging from 5–100 microns, averaging 15–30 microns with about 5% coarser than 44 microns, pounds per bbl of saturated saline solution) | 19 | 19 | 19 | 19 | 19 | 440 |
| Guar Gum, (pounds per bbl saturated saline solution) | | | | | 2 | |
| Calcium Lignosulfonate (pounds per bbl saturated saline solution) | | | | 6 | | 20 |
| Xanthan Gum (pounds per bbl saturated saline solution) | | | 1 | 1 | | 1 |
| Pre-Gelatanized Starch (pounds per bbl saturated saline solution) | | | | | | |
| Carboxymethyl Cellulose (CMC-9) (pounds per bbl saturated saline solution) | | | | | | |
| Carboxymethyl Celluose (CMC-7) (pounds per bbl saturated saline solution) | | 4 | | | | |
| PROPERTIES | | | | | | |
| Density in pound per gal. | 10.2 | 10.2 | 10.2 | 10.2 | 10.2 | 13.0 |
| Plastic Viscosity, (centipoises) | 33 | 80 | 12 | 27 | 14 | 48 |
| Yield Point, (lb per 100 sq. ft.) | 58 | 70 | 11 | 31 | 23 | 27 |
| API Filtrate, (ml) | 29.2 | 12.0 | 14.0 | 9.4 | 20.0 | 7.2 |
| Seal on 1000 millidarcy Sand Bed at 100 psi | Partial | Good | Good | Good | Partial | Good |

Any other suitable fluid loss control agent may be employed with the present invention in the concentration range mentioned above.

What is claimed is:

1. In a well completion and workover method wherein a subterranean formation in a well is contacted with a treating fluid, the steps comprising:
   a. pumping the treating fluid in the well and contacting the formation with said treating fluid wherein said treating fluid comprises:

(1) a saturated aqueous saline solution with at least one water soluble salt which is substantially insoluble in the saturated saline solution;
(2) said saturated aqueous saline solution being formed from, and said water soluble salt being selected from one or more of the group consisting of potassium chloride, sodium chloride, calcium chloride, sodium sulfate, sodium carbonate, sodium bicarbonate, calcium bromide and potassium carbonate; and
(3) said treating fluid also including a minor amount of a fluid loss additive to inhibit loss of fluid into the formation and a suspension additive to prevent settling of the water soluble salt particles;
b. controlling the pressure in the well during the workover and completion by maintaining the quantity of said water soluble salt weighing particles present in the saturated aqueous saline solution in the range of approximately 10 pounds per barrel to about 900 pounds per barrel of saturated aqueous saline solution;
c. forming a bridge and seal on the formation to bridge and seal off the formation by maintaining said water soluble salt which is substantially insoluble in the saturated saline solution in a particle size range of about 5 microns to about 800 microns with greater than about 5% of the particles being coarser than 44 microns; and
d. dissolving the water soluble salt bridging and weighting particles off the formation to remove the bridge and seal from the formation for flow of hydrocarbons therefrom into the well.

2. The well completion and workover method of claim 1 wherein the fluid loss additive is in the amount of about 0.2 pounds per barrel to about 30 pounds per barrel of saturated saline solution, and wherein the suspension additive is in the amount of about 0.2 pounds per barrel to about 5 pounds per barrel of saturated saline solution.

3. The well completion and workover method of claim 2 wherein the fluid loss additive is selected from the group consisting of calcium lignosulfonate, chrome or ferro chrome lignosulfonate, corn, potato and tapioca starches, and carboxymethyl cellulose having a degree of substitution in the range of 0.4 through 0.9 and mixtures thereof.

4. The well completion and workover method of claim 2 wherein the suspension additive is selected from the group consisting of xanthan gum, guar gum, carboxymethyl hydroxypropyl guar gum, carboxymethyl hydroxyethyl cellulose having a carboxymethyl degree of substitution of at least 0.4 and a hydroxyethyl substitution from about 0.1 or lower to about 4 or higher, carboxymethyl cellulose having a degree of substitution in the range of 0.7 through 0.9 and carboxymethyl cellulose having about 1 to 3 moles of substitutent ethylene oxide per anhydroglucose unit and is characterized by a Brookfield viscosity of about 1,500 to 5,000 centipoises at 25° C. for a 1 weight percent solution and mixtures thereof.

5. The completion and workover method of claim 1 wherein the pH of the treating fluid is adjusted to about 7 by adding any of the group consisting of alkaline earths and sodium hydroxide.

* * * * *